United States Patent [19]

Norris

[11] 3,736,582

[45] May 29, 1973

[54] GALLOPING BASE LINE COMPENSATING CIRCUIT

[75] Inventor: Kermit A. Norris, Duarte, Calif.

[73] Assignee: Leach Corporation, Azusa, Calif.

[22] Filed: Mar. 20, 1972

[21] Appl. No.: 236,379

[52] U.S. Cl. ..........................................340/174.1 H

[51] Int. Cl. ............................G11b 5/02, G11b 5/44

[58] Field of Search ................340/174.1 H, 174.1 B; 179/100.21 C

[56] References Cited

UNITED STATES PATENTS

| | | | |
|---|---|---|---|
| 3,478,255 | 11/1969 | Parker et al. | 340/174.1 H |
| 3,462,724 | 2/1971 | Adler et al. | 340/174.1 H |
| 3,660,821 | 5/1972 | Weber et al. | 340/174.1 H |
| 3,622,894 | 11/1971 | Heidecker et al. | 340/174.1 H |

*Primary Examiner*—Vincent P. Canney
*Attorney*—Harold L. Jackson, Stanley R. Jones, Robert M. Vargo et al.

[57] ABSTRACT

A compensation circuit that operates to appropriately adjust upward or downward the zero threshold or base line used in recovering digital data recorded in a coded form susceptable to galloping base lines, is disclosed. The compensation circuit operates to detect each transition of the coded signal with respect to the zero threshold. The transitions are further detected to be either an up-going or down-going transition and either early or late with respect to a selected time at which such transition should properly threshold Adjustment of the zero trashold level is made in accordance with the detected characteristics, i.e., upgoing or down-going, early or late, of each transition.

18 Claims, 5 Drawing Figures

GALLOPING BASE LINE COMPENSATING CIRCUIT

BACKGROUND OF THE INVENTION

1. Field of the Invention

This invention generally relates to circuitry having application with systems adapted to recover digital data recorded on a magnetic medium. More specifically, the present invention concerns a circuit that operates to compensate for difficulties in playback attributable to undersired repositioning of zero threshold levels due to the unavoidable loss of DC components attendant to certain codes used in the recordation of data.

2. Description of the Prior Art

Digital data is commonly recorded, i.e., on a magnetic medium, using a code of some sort. As an example, such coding may be used to permit the data to be recorded on the recordation medium at a high density. Among the codes commonly used are the well known families identified as bi-phase codes and double-density codes. Common to both these families of codes is the need for detecting the occurrence of signal transitions with respect to a zero threshold level to recover the recorded data.

This bi-phase code is generally characterized by one or two transitions per data bit, and hence involves either one or two units of delay between transitions. Double-density codes, by comparison, are characterized by requiring a maximum of one transition per bit. The double-density codes accordingly involve two, three, or four units of delay between transitions.

Although only one-half as many transitions are required for double-density codes, nowhere near double the density can be actually attained in recording digital data. There are primarily three limitations to which this may be attributed. In order of decreasing significance, these limitations are: the choice between three different delay lengths instead of two; the ambiguity produced by the repositioning of the zero threshold level or base line; and the lack of a matched filter or other optimum detector for double-density codes.

The repositioning of the zero threshold level used in playback, which effect is sometimes referred to as a "galloping" base line, is peculiar to double-density codes. This effect results from the double-density codes having strong DC components which are lost during playback. Different bit patterns produce different DC components. It has been found that the worst situation is presented by a pattern of alternating maximum and minimum delays, i.e., two, four, two, four, etc. In such a case, the DC component can be ± 33.3 percent of the peak signal voltage. The shift of both the envelope, and the ideal zero threshold due to loss of the DC components, has been found to occur slowly and generally exponentially. More precisely, the shape of the envelope shift and its final value are functions of the low frequency response of the recorder. Accordingly, if a 33.3 percent DC shift occurred in the waveform, the ultimate shift of the playback envelope would be graphically equivalent to a step function (for DC shift) from which the recorder's step function response is subtracted to leave an exponential function.

The shift of the envelope, when not compensated for, contributes to inaccuracies in the playback of recorded data by making it difficult to distinguish delays of "three" units from delays of "two" and "four" units. This difficulty is due to the transitions occurring increasingly early or late with respect to the fixed zero threshold such that the delays of "two" and "four" units are detected as delays of "three" units.

As an example, if an up-going transition arrives after a delay of 2.2 units, then it is probably a late "two" and the zero threshold reference voltage should be shifted to a lower level. Similarly, a down-going transition that occurs after a delay of 2.9 units is probably an early "three" and the zero threshold reference voltage may again be shifted to a lower level to compensate for the envelope shift which produced the early and/or late transitions. Clearly, if no correction is made, and the envelope shift continues toward a maximum of ± 33 percent, then the delays of "two" and "four" units will become indistinguishable from the "three" unit delays.

It is accordingly the intention of the present invention to provide a circuit that will sense, track, and correct for any repositioning of the zero threshold level for playback systems intended to recover data recorded as a double-density code such that inaccuracies due to such undesired repositioning is compensated for and at least two of the above-mentioned three limitations attendant to the use of double-density codes are eliminated.

SUMMARY OF THE INVENTION

Briefly described, the present invention involves a galloping base line compensation circuit which serves to sense, track and correct for any repositioning of the zero threshold in the recovery of recorded double-density coded data.

More particularly, the subject compensation circuit includes detectors for sensing and identifying the direction of each transition. The transitions are logically detected to determine whether its occurrence is early or late with respect to an idealized delay time. A pulsed waveform from an aperture may be used as the "yardstick" for determining whether a transition is early or late. A multibit up/down counter is incremented after each transition in accordance with the up/down and early/late characteristics of the transition. The output of the counter may then be employed to vary the zero threshold reference voltage of a comparator which operates to detect the successive transitions during playback.

The object and many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
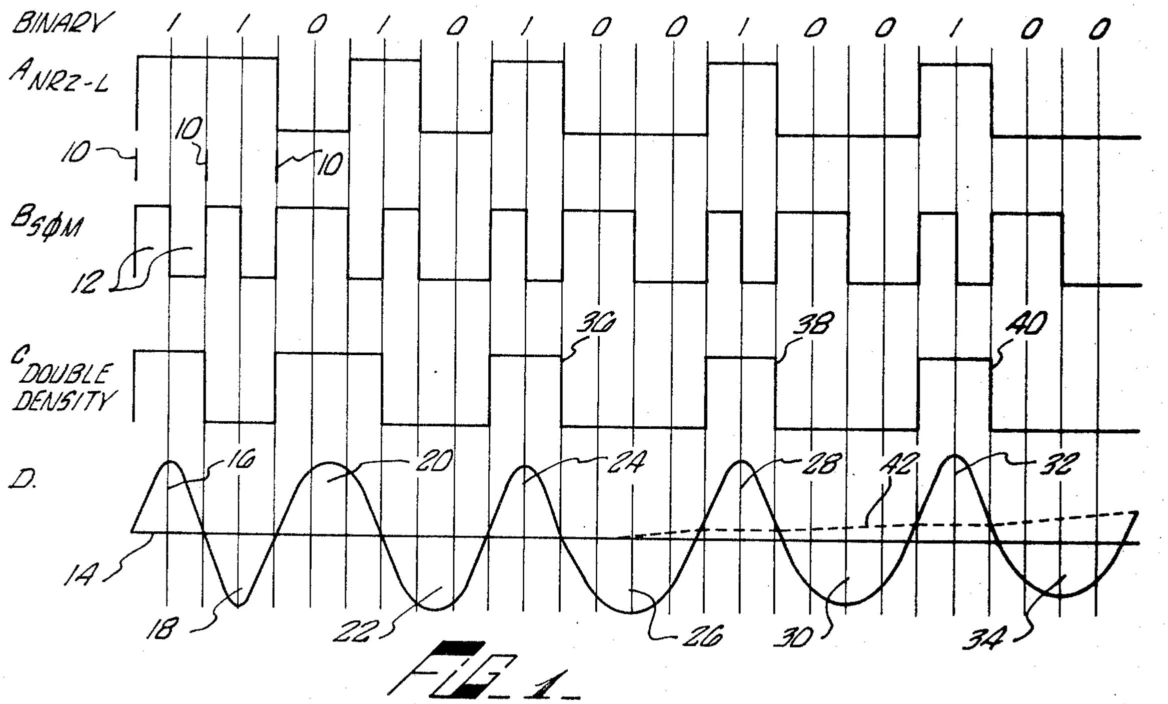
FIG. 1 is a graphic diagram illustrating a number of waveforms that are useful in describing in greater detail the problems solved by the subject invention.

Referring to FIG. 1, the series of waveforms graphically illustrate the form in which binary or digital data may appear when encoded. Specifically, waveform A illustrates the binary sequence 1 1 0 1 0 1 0 0 1 0 0 1 0 0 as it would appear in a NRZ format. As is well known, the NRZ waveform simply assumes one of two states or voltage levels for the two different binary bits 1 and 0.

By comparison, both bi-phase and double-density codes involve the use of transitions through a zero threshold to distinguish the binary bits 1 and 0. As such, transitions are important rather than voltage levels in the coding and decoding processes. Waveform B illustrates the above sequence in the well known bi-phase code referred to as SOM. As shown, a mid-bit transition distinguishes a binary "1" from a binary "0".

An exemplary double-density code is illustrated by waveform C. This double-density code simply involves eliminating every other transition included in the SOM format. Accordingly, the double-density code involves one half as many transitions as the bi-phase code as exemplified by the SOM format.

Referring once again to waveform B, each bit cell has a pair of boundaries designated by the lines 10. Assuming that each one half bit cell period is a delay unit, each bit cell would include two delay units 12. The SOM format thus includes one or two delay units between transitions. In terms of these delay units 12, the double-density code involves delays of two, three or four units between successive transitions. As earlier mentioned, this becomes important in the recovery of data recorded in a double-density code since it is necessary to distinguish among delays having three different lengths rather than the two lengths for the SOM format.

As earlier discussed, the double-density code has strong DC components which are lost during playback, Waveform D illustrates an exemplary signal that may be recovered during playback. As shown, the loss of the DC components results in the recovered signal seeking to balance itself with respect to a fixed zero threshold level designated by a central line 14. Where successive areas of the signal above and below the threshold are characterized by equal delay times between transitions such as the areas 16 and 18, each having a delay of two units, the signal is naturally balanced. This also holds true for the successive areas 20 and 22 which each involve a delay of three units. The successive areas 24, 26, 28, 30, 32, and 34, on the other hand, illustrates the earlier mentioned worst possible delay sequence including alternating delays of two and four units between transitions. The areas 24, 28, and 32, corresponding to the respective areas 36, 38, and 40 of waveform C, would have been originally recorded to have delays of two units. The successive areas 26, 30 and 34 would have been recorded as having delays of four units. As shown by waveform D, the loss of the DC components during playback permits the shifting of the signal envelope with respect to the zero threshold 14. This upward shift causes the transitions of the recovered signal through the zero threshold 14 to become closer together, i.e., shortened delay, for the areas 26, 30 and 34 such that the original delays of four units tend to become delays of three units. Clearly, a continuing upward shift of the signal envelope will eventually have the portions 26, 30 and 34 detected as having delays of three units between transitions along the threshold 14. Similarly, the portions 28 and 30 are shown to have the transitions spread apart such that the original delay of two units is increased toward three units. A continuing upward shift of the signal envelope accordingly would eventually have the transitions of portions 28 and 32 spaced apart by three units when measured along the fixed threshold 14.

Clearly, the actual and real delays between transitions should be measured along the idealized zero threshold 42 shown as a dashed line. This would, of course, require the difficult accomplishment of tracking the idealized zero threshold 42.

As an alternative, incremental corrections for the shifting signal envelope, and zero threshold may be made after each transitions since the shifting of the signal envelope is slow in occurring. With this alternative, as used by the present invention, the shifting can be continually accommodated and thereby not permitted to become maximized to the point that delays of two units are increased to three units and delays of four units are shortened to three units.

Accordingly, the present invention operates to sense whether a transition is early or late, and up-going or down-going. A compensatory shift of the zero threshold or reference voltage used in the playback circuitry for detecting transitions can then be made in accordance with the characteristics of each transition.

Figure 2:
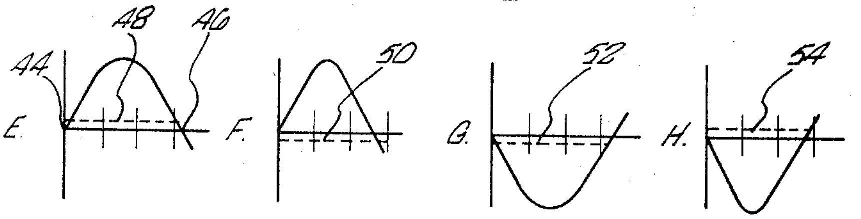
FIG. 2 is a graphic diagram illustrating the four different combination of variables by which a transition may be characterized, i.e., up or down, early or late.

Referring to FIG. 2, waveform E illustrates a late down-doing transition which may numerically be a delay of 3.1 units rather than the desired three units. An upward compensatory shift of the zero threshold would thus be required to correct for the lengthened delay. The successive transitions designated 44 and 46 would then occur closer in time with respect to each other, i.e., the delay is shortened. Waveform F illustrates an early down-going transition wherein a downward compensatory shift, shown by the dashed line 50, would be required to restore the original delay of three units. Waveforms G and H respectively illustrate up-going transitions which are late and early. The late up-going transition would require a downward compensatory shift of the zero threshold as illustrated by the dashed line 52. The early up-going transition of waveform H would require an upward compensatory shift, shown by the dashed line 54, to restore the original three unit delay. It is noted that the waveforms E, F, G and H are only symbolic and that the proportions of the signal, and positions of the transitions, have been exaggerated for clearer illustration.

Figure 3:
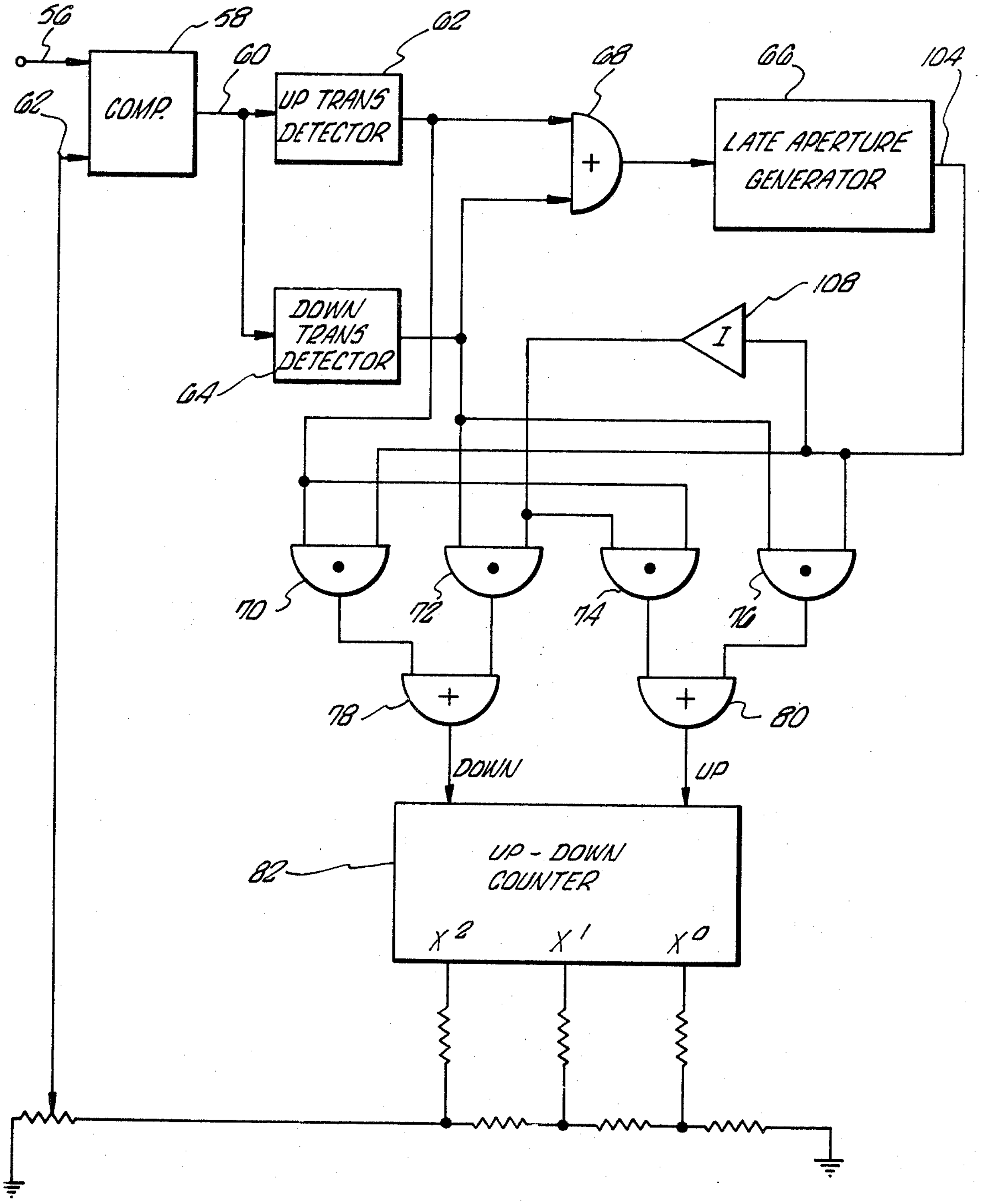
FIG. 3 is a schematic diagram illustrating a galloping base line compensation circuit in accordance with the present invention.

A galloping base line compensation circuit in accordance with the present invention is illustrated by FIG. 3. Recovered recorded signals such as exemplified by waveform D, FIG. 1, are applied to an input terminal 56 of a comparator circuit 58 which operates to detect each transition. The output signal provided by the comparator 58 at an output lead 60 may be the algebraic polarity between the recovered signal applied to the input terminal 56 and a reference voltage applied at a reference terminal 62. Any available comparator circuit that is well known in the prior art may be used. The reference voltage applied to the terminal 62 would represent the zero threshold voltage level. A zero amplitude for the output signal at the terminal 60 would indicate that the input signal has crossed the zero threshold, i.e., such zero transition has occurred.

The output of the comparator 58 is applied to an up-going transition detector circuit 62 and a down-going transition detector circuit 64 which serve to detect whether a transition is up-going or down-going. Both these detector circuits 62 and 64 may be of any conventional type well known in the prior art. Functionally, up-going transitions as exemplified by waveforms G and H, FIG. 2, would cause an output signal to be provided by the up-going transition detector 62. Down-going transitions of the type illustrated by waveforms E and F, FIG. 2, would cause an output signal to be provided by the down-going transition detector 64.

The outputs of both these detectors 62 and 64 are applied as a reset signal to a late aperture generator 66 via an OR gate 68. The outputs of these detectors 62 and 64 are also selectively provided as inputs to certain ones of a series of AND gates 70, 72, 74, and 76. Specifically, the output of the up-going transition detector 62 is provided as an input to the AND gates 70 and 74. The output of the detector 64 is applied as an input to the AND gates 72 and 76.

The AND gates 70, 72, 74 and 76 in conjunction with a pair of OR gates 78 and 80, generally serve to provide a signal indicative of whether a particular transition is early or late. Such signals are provided from the OR gates 78 and 80, as is hereinafter described, and are used as control signals for an up/down counter 82 to produce a desired compensatory shift of the zero threshold by controlling the voltage level applied at the reference terminal 62.

The early/late determination is accomplished by logically coinciding a distinctive early/late signal from the aperture generator 66 with the output of one of the detectors 62 and 64 at one of the AND gates 70, 72, 74 or 76.

Figure 4:
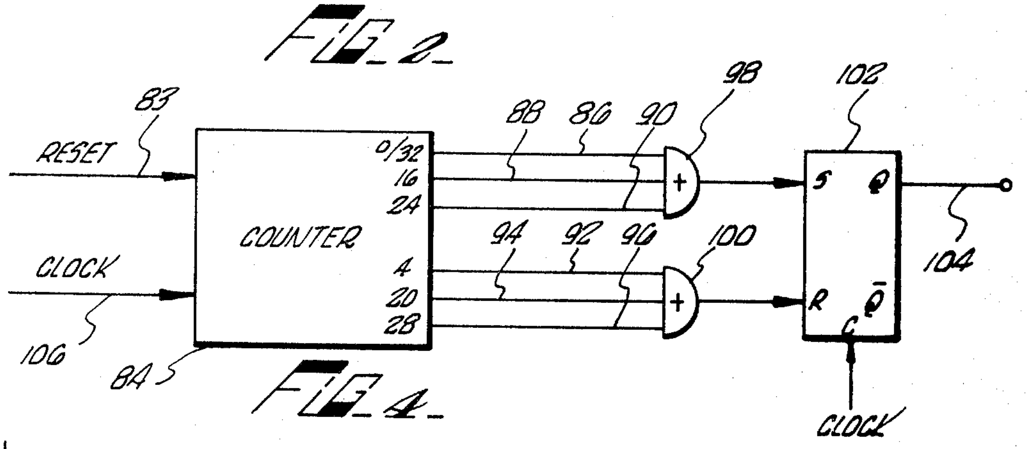
FIG. 4 is a schematic diagram illustrating an exemplary aperture generator that may be used in conjunction with the compensation circuit shown by FIG. 3.

Referring briefly to FIG. 4, the late aperture generator 66 may simply include a counter 84 that is, for example, designed to count from 0 to 32. The counter may have a series of output terminals at which an output signal will be provided upon the counter attaining a selected count. As an example, the counter 84 may be provided with terminals 86, 88, 90, 92, 94 and 96 at which signals may be provided at the counts described in Table I hereinbelow:

TABLE I

| Terminal | Count | Function |
|---|---|---|
| 86 | 0 or 32 | SET |
| 88 | 16 | SET |
| 90 | 24 | SET |
| 92 | 4 | RESET |
| 94 | 20 | RESET |
| 96 | 28 | RESET |

Figure 5:
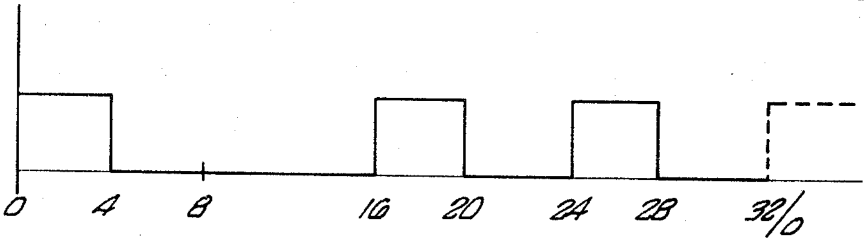
FIG. 5 is a graphic diagram illustrating the waveform of a signal that may be produced by the aperture generator shown in FIG. 4.

The terminals 86, 88, and 90 are connected as inputs to an OR gate 98, while the terminals 92, 94 and 96 are connected to apply the signals to another OR gate 100. The output of the OR gate 98 is connected to SET a flip-flop 102 while the output of the OR gate 100 is connected to RESET the flip-flop 102. An output terminal 104 is connected to the SET output of the slip-flop 102 such that a high voltage level is provided at the terminal 104 whenever the slip-flop is SET. FIG. 5 illustrates a waveform depicting the output signal that will be cyclically provided at the output terminal 104. As shown, the flip-flop 102 will be set by the output signal provided over the lead 86 via the OR gate 98 at the count of "0" or "32". The output signal at the terminal 104 will thus assume a high level and maintain that level until the flip-flop 102 is RESET. The flip-flop 102 will be RESET in response to the signal provided over the lead 92 via the OR gate 100 to the RESET terminal of the flip-flop 102 at the count of "4". The output to the terminal 104 will convert to and remain at a low level until the flip-flop 102 is again SET. As may be observed from the waveform of FIG. 5, the flip-flop 102 is next SET when the counter 84 reaches the count of "16". The flip-flop 102 remains SET until the count of "20" at which time it is RESET. The flip-flop 102 is next SET at a count of "24", and is subsequently RESET at a count of "28". The repeating cycle is completed at the count of "32" which may thus coincide with the count of "0".

The counts "0" to "32" may be correlated with the delay units between the transitions of a recovered signal by allotting "8" counts for each unit of delay. The time elapsing from a count of "0" to a count of "16" would then correspond to a time delay of two units. The elapsed time for a count of "24" would correspond to a time delay of three units. The elapsed time for a full count of "32", or "0", would then correspond to a time delay of four units. For double-density codes, only the delays of two, three and four units are important and accordingly the counts "16", "24" and "0/32" are of primary significance. From the waveform of FIG. 5 it may be observed that the counts immediately preceding the count of "16" are at one voltage level, whereas the counts immediately succeeding the count of "16" are at a second level. The same hold true for the counts "24" and "32". Otherwise described, using the time delay of three units for purposes of discussion, counts such as "22" and "23" would correspond to an early three unit transition, while the counts "25" and "26" would be late three's. Accordingly, where the counter 84 is appropriately timed with a clock signal applied to a terminal 106, the counter 84 may be synchronized with the playback system. Transitions occurring at the counts immediately preceding the count "24" would then be early three unit transitions, whereas transitions occurring at counts of "25" or "26" would be late transitions. Similarly, transitions occurring at counts of "14", "15", "30" or "31" be early transitions, whereas transitions occurring at counts of "17", "18", or "1" or "2" would be late transitions. For reasons that will hereinafter become apparent, the counter 84 is RESET or initialized for each transitions by the outputs applied from the detector 62 and 64 via the OR gate 68.

When the signal illustrated by FIG. 5 is provided over the lead 104 from the generator 66 to the AND gates 70, 72, 74 and 76, a high level, or late, signal will be provided to the AND gates 70 and 76 for the counts "0" to "4", "16" to "20", and "24" to "28". An early signal would be provided to the AND gates 72 and 74 at all other times via an inverter circuit 108. Thus, the AND gate 70 will have signals present at the inputs thereof whenever there is an up-going transition that is late such as illustrated by waveform G. The AND gate 72 would have signals present at the inputs thereof for early down-going transitions such as illustrated by waveform F. The AND gate 74 would receive both input signals for early up-going transitions such as illustrated by waveform H. The AND gate 76 would receive both inputs in response to late down-going transitions such as illustrated by waveform E.

As earlier mentioned, the late up-going transitions and early down-going transitions, which will respectively the evidenced by output signals from the AND gates 70 and 72, require a downward compensatory shift of the zero threshold. This is accomplished by having the outputs of the AND gates 70 and 72 applied through the OR gate 78 as an input to the up/down counter 82 to produce a downward count. Similarly, early up-going transitions and late down-going transitions which are respectively evidenced by outputs from one of the AND gates 74 and 76, both require an upward compensatory shift of the zero threshold. The outputs of the AND gates 74 and 76 are thus applied via the OR gate 80 as an input to the up/down counter 82 to produce an upward count.

The up/down counter 82 may accordingly be used to vary the reference voltage applied at the reference terminal 62 of the comparator 58 in response to the count thereof. The counter 82 would be initially set at a median count and where a three bit counter is used, the median count may be, for example, a count of "3" or "4". Accordingly, an input signal received via the OR gate 78 would cause a reduction in the count from, for example, "4" to "3", or from "3" to "2", etc. Conversely, an input to the counter 82 from the OR gate 80 would produce an upward count from "4" to "5" or from "5" to "6", etc. As shown, the counter 82 may have a plurality of output terminals connected to a resistor network of any type well known in the prior art such that the higher the count of the counter 82, the greater will be the voltage level applied at the terminal 62 of the comparator 58. Conversely, the lower the count of the counter 82, the lower would be the voltage level applied at the terminal 62. With such an arrangement, the voltage level at the terminal 62 would be continually adjusted upward or downward by simply controlling the counter 82 to count either higher or lower in the fashion described for each transition.

It is noted that the greater the number of counts for the counter 82, the smaller can be the increments of change for the zero threshold reference voltage. Of course, where the shifting of the reference voltage is confined to a generally narrow range of voltages, the exemplary three bit counter would be sufficient. It is also noted that the disclosed arrangement will cause a shift of the zero threshold for each transition which thus will be continually shifted between adjacent median levels. This has been found to cause no significant problem in that small time delays, i.e., 2.9. are readily interpreted as a three unit delay. Significantly, a two unit delay or a four unit delay would never be permitted to closely approach a delay of three units in that compensatory shifts are continually being made. The slow changing shifts in the signal envelope can thus be readily compensated.

From the foregoing, it is now clear that the subject galloping base line compensation circuit will operate to determine the characteristics of each transition, as it occurs, to be either early or late, and up-going or down-going, wherein such characteristics are employed to produce a compensatory shift of the zero threshold reference voltage for a comparator which is used to detect transitions in the recovery of signals recorded in a double-density format.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A compensation circuit for detecting and compensating for any repositioning of the zero threshold of recorded data in the recovery thereof from a recording medium, said recovery of data involving recovered data signals, said compensator circuit including:

detector means for detecting the direction of transitions of said recovered data signals through said zero threshold to be either up-going or down-going, a direction signal being provided;

aperture means for providing a timing signal that serves to indicate time elapsing between transitions with respect to selected times, the timing signal having a first level preceding said selected times and a second level succeeding said selected times; and gating means, responsive to said direction signal and said timing signal, for providing a correction signal indicative of the direction of said repositioning of said zero threshold.

2. The circuit defined by claim 1, wherein a reference voltage signal is employed in the recovery of recorded data to detect transitions of said recovered data signal, said compensation circuit further including adjustment means responsive to said correction signal for increasing or decreasing said reference voltage to be modified in a direction opposite said repositioning of said zero threshold.

3. The circuit defined by claim 1, said detector means including:

first means for detecting up-going transitions of said recovered data signals; and second means for detecting down-going transitions of said recovered data signals, said direction signal being provided from either said first or second means in response to each transition of said recovered data signal.

4. The circuit defined by claim 1, said aperture means including:

timing signal means for providing a pulsed signal having a first level or a second level in response to being set or reset, respectively; and means for setting said timing signal means at said selected times to provide a change of levels for said pulsed signal at said selected times, said timing signal means being reset a predetermined period after said selected times.

5. The circuit defined by claim 4, said timing means including a bistable device adapted to change states in response to signals applied to set and reset terminals thereof, said means for setting said timing signal means including a counter having output terminals connected to provide signals to set said bistable device at said selected times, said counter having terminals connected to reset said bistable device a predetermined period after said selected times.

6. The circuit defined by claim 1, said gating means including a plurality of AND gates connected to receive a direction signal from said detector means, particular one of said AND gates providing an output responsive to coincidently receiving said timing signal, the output of said AND gate forming said correction signal and indicating the direction of said repositioning of said zero threshold.

7. The circuit defined by claim 2, said adjustment means including an up/down counter connected to receive said correction signal, the contents of said up/-down counter being incremented upward as dictated by said correction signal when applied to an up command terminal or incremented downward by said correction signal when applied to a down command terminal of said up/down counter.

8. The circuit defined by claim 3, said aperture means including:

timing signal means for providing a pulsed signal having a first level or a second level in response to being set or reset, respectively; and means for setting said timing signal means at said selected times to provide a change of levels for said pulsed signal at said selected times, said timing signal means being reset a predetermined period after said selected times.

9. The circuit defined by claim 8,said gating means including a plurality of AND gates connected to receive a direction signal from said detector means, a particular one of said AND gates providing an output responsive to coincidentally receiving said timing signal, the output of said AND gate forming said correction signal and indicating the direction of said repositioning of said zero threshold.

10. The circuit defined by claim 9, wherein a reference voltage signal is employed in the recovery of recorded data to detect transitions of said recovered data signal, said compensation circuit further including adjustment means responsive to said correction signal for increasing or decreasing said reference voltage to be modified in a direction opposite said repositioning of said zero threshold.

11. The circuit defined by claim 10, said adjustment means including an up/down counter connected to receive said correction signal, the contents of said up/-down counter being incremented upward as dictated by said correction signal when applied to an up command terminal or incremented downward by said correction signal being applied to a down command terminal of said up/down counter.

12. The circuit defined by claim 11, said timing means including a bistable device adapted to change states in response to signals applied to set and reset terminals thereof, said means for setting said timing signal means including a counter having output terminals connected to provide signals to set said bistable device at said selected times, said counter having terminals connected to reset said bistable device a predetermined period after said selected times.

13. A compensation circuit for adjusting the zero threshold reference voltage used by playback circuitry for detecting the transitions of a recovered data signal through a zero threshold level, the compensation circuit including:

means for determining the characteristics of each said transitions to be either up-going or down-going and either early or late with respect to selected times, a transition characteristic signal being provided indicative of the repositioning of said zero threshold from an initial level; and control means responsive to said transition characteristic signal for adjusting said zero threshold reference voltage to compensate for said repositioning of said zero threshold from an initial level.

14. The circuit defined by claim 13, said means for detecting the characteristics of each said transitions including:

first means for detecting said transitions to be up-going or down-going, a corresponding direction signal being provided;

second means for providing an early/late timing signal having an early level preceding said selected time and a late level suceeding said selected times; and third means responsive to said direction signal and said early/late signal for providing said transition characteristic signal.

15. The circuit defined by claim 14, said first means including:

a first detector for detecting up-going transitions; and a second detector for detecting down-going transitions.

16. The circuit defined by claim 15, said second means including:

a bistable device adapted to be set and reset in response to signals applied to set and reset terminals thereof,said early/late signal being provided at an output terminal of said bistable device; and a counter connected to set and reset said bistable device at certain counts corresponding to said selected times, the counter being connected to be initialized in response to signals applied from said first or second detectors.

17. The circuit defined by claim 16, said third means including a plurality of AND gates selectively connected to said first and second detectors and to said bistable device to have a single one of said AND gates enabled for each transition, the enabled AND gate providing a transition characteristic signal to said control means.

18. The circuit defined by claim 17, the control means including an up/down counter having an up command input terminal and a down command input terminal which are respectively connected to selected ones of said AND gates, said up/down counter being incremented in response to a transition characteristic signal from an AND gate and in a direction corresponding to a required adjustment of said zero threshold reference voltage.

* * * * *